United States Patent
Griffin (10) Patent No.: US 7,417,565 B2
(45) Date of Patent: Aug. 26, 2008

(54) KEYBOARD FOR HAND-HELD DEVICES

(75) Inventor: Jason T. Griffin, Kitchener (CA)

(73) Assignee: Research In Motion Limited, Waterloo, Ontario (CA)

(*) Notice: Subject to any disclaimer, the term of this patent is extended or adjusted under 35 U.S.C. 154(b) by 301 days.

(21) Appl. No.: 11/245,809

(22) Filed: Oct. 7, 2005

(65) Prior Publication Data

US 2007/0057821 A1  Mar. 15, 2007

Related U.S. Application Data

(60) Provisional application No. 60/716,736, filed on Sep. 13, 2005.

(51) Int. Cl.
*H03M 11/00* (2006.01)
(52) U.S. Cl. .............. 341/22; 341/20; 341/21; 341/23; 341/26; 341/34; 200/4; 200/5 A; 200/345; 200/406; 345/168; 345/172
(58) Field of Classification Search .......... 341/22, 341/20, 34; 200/4, 5 A, 345, 406; 345/168, 345/172
See application file for complete search history.

(56) References Cited

U.S. PATENT DOCUMENTS

| | | | | |
|---|---|---|---|---|
| 4,716,262 A | * | 12/1987 | Morse | 200/5 A |
| 4,803,316 A | * | 2/1989 | Hayashi et al. | 200/406 |
| 4,849,732 A | * | 7/1989 | Dolenc | 341/20 |
| 5,061,094 A | | 10/1991 | Buttner et al. | |
| RE34,304 E | * | 7/1993 | Goldwasser et al. | 341/22 |
| 5,336,001 A | * | 8/1994 | Lichtenberg | 400/489 |
| 5,496,982 A | * | 3/1996 | Tsai | 200/345 |
| D416,256 S | | 11/1999 | Griffin et al. | |
| 6,103,979 A | * | 8/2000 | Motoyama et al. | 200/4 |
| D472,551 S | | 4/2003 | Griffin | |
| 6,752,552 B1 | | 6/2004 | Sabato | |
| 6,847,310 B1 | | 1/2005 | Gill et al. | |
| 6,867,763 B2 | | 3/2005 | Griffin et al. | |
| 6,891,529 B2 | | 5/2005 | Ladouceur et al. | |
| 7,106,222 B2 | * | 9/2006 | Ward et al. | 341/34 |
| 2001/0031167 A1 | | 10/2001 | Morelos | |
| 2002/0063690 A1 | * | 5/2002 | Chung et al. | 345/168 |
| 2003/0002909 A1 | * | 1/2003 | Jeffries et al. | 400/714 |

FOREIGN PATENT DOCUMENTS

CA  2517815 A1  3/2002

OTHER PUBLICATIONS

A brochure "Treo 600" by palmOne, Inc. of California, U.S.A., published 2004 (T600 DSCDMA 0704).

* cited by examiner

*Primary Examiner*—Davetta W. Goins
*Assistant Examiner*—Sisay Yacob (57) ABSTRACT

A hand-held electronic device has a keyboard with a plurality of keys, each key having a substantially flat contact surface extending to the sides of each key. One of the sides of the key is beveled.

22 Claims, 5 Drawing Sheets

KEYBOARD FOR HAND-HELD DEVICES

CROSS-REFERENCE TO RELATED APPLICATION

The present application claims the benefit of prior provisional application Ser. No. 60/716,736, filed Sep. 13, 2005, the contents of which are hereby incorporated herein by reference.

BACKGROUND

This invention relates to a hand-held electronic device.

Numerous hand-held electronic devices are available as information stores for personal contacts, calendar appointments, and the like. Additionally, many hand-held devices wirelessly connect to the public Internet to allow for the sending and receiving of e-mail. Such hand-held devices may also provide more general Internet access, such as access to the World Wide Web. Further, many such hand-held devices also double as a cell phone.

A number of user interfaces have been utilised for these hand-held devices. Once such interface is a QWERTY keyboard. These QWERTY keyboards may be designed so they are particularly suited to use with the thumbs only. There is a trend for hand-held devices to shrink in size so as to provide a more streamlined look and so that the devices are more portable. This is particularly prevalent for hand-held devices which also provide cell phone functionality. As these devices become smaller, so do their keyboards, which provides a challenge to find a keyboard design that, despite its small size, remains usable.

The TREO™ 600 by Palmone, Inc. copes with the small keyboard by providing domed keys. The domed shape of the keys effectively provides a gap between keys and also provides the user with a tactile target which assists the user in perceiving which key was pressed.

This invention seeks to provide an improved keyboard design suited for hand-held devices.

SUMMARY OF INVENTION

A hand-held electronic device has a keyboard with a plurality of keys, each key having a substantially flat contact surface extending to the sides of each key. One of the sides of the key is beveled.

Other features and advantages will become apparent from a review of the following description in conjunction with the drawings.

BRIEF DESCRIPTION OF THE DRAWINGS

In the figures which illustrate an example embodiment of the invention.

DETAILED DESCRIPTION

The inventor has realised that a domed key keyboard has a number of disadvantages. Firstly, the dome provides a very small bulls-eye at the peak of the dome. In consequence, if the thumb of a user presses a key while not directly centered on the key, the tactile target provided by the dome shape suggests the key has not been squarely hit. This reduces the confidence level of the user. The typical consequence of reduced confidence is lower typing speed. It is therefore believed that the domed keys do not promote fast input. Secondly, the top of the domes of the keys act as pressure points which, over extended use, can be irritating to the thumbs of a user.

Figure 1:
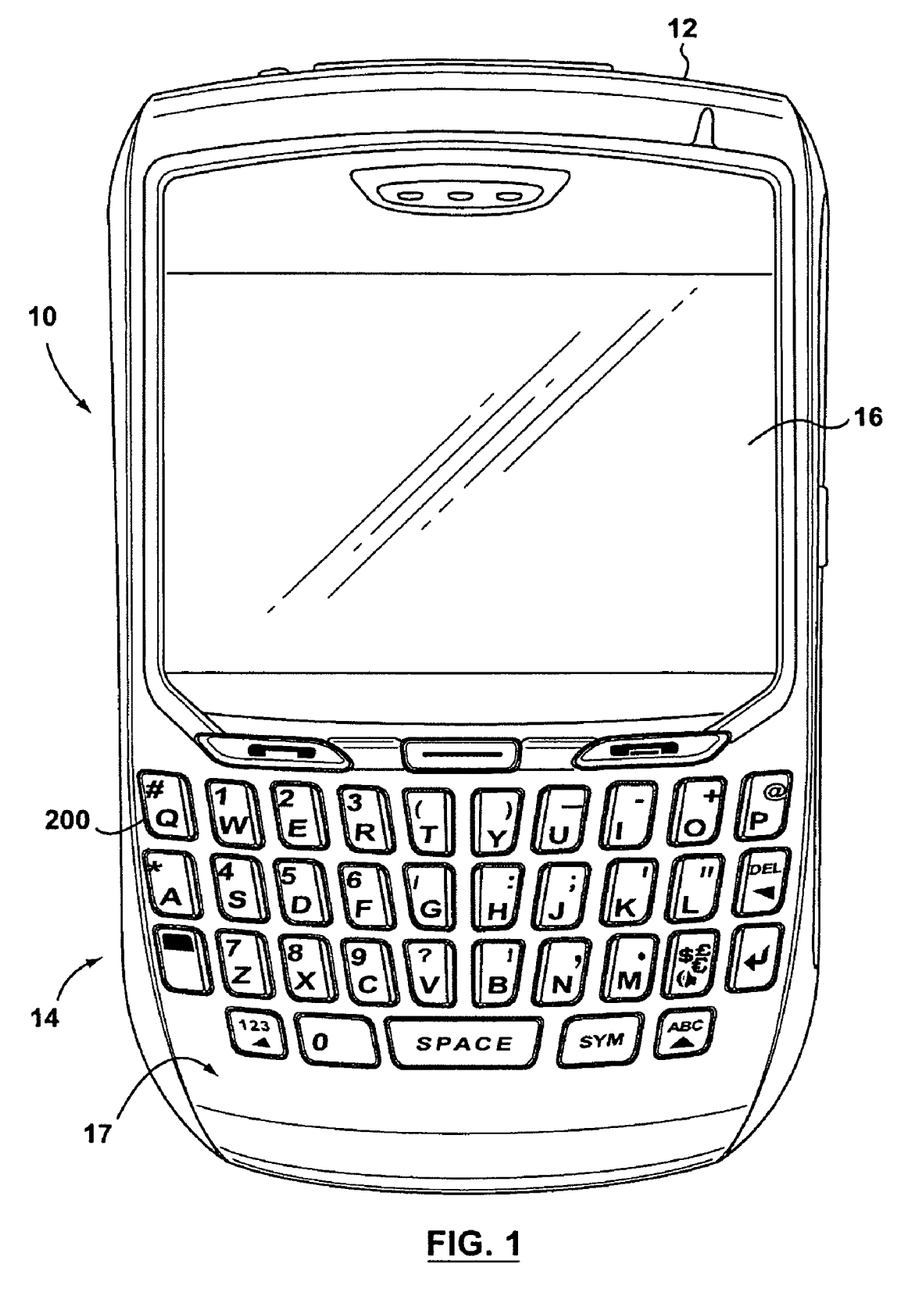
FIG. 1 is a front view of a hand-held electronic device made in accordance with an embodiment of this invention.
Figure 2:
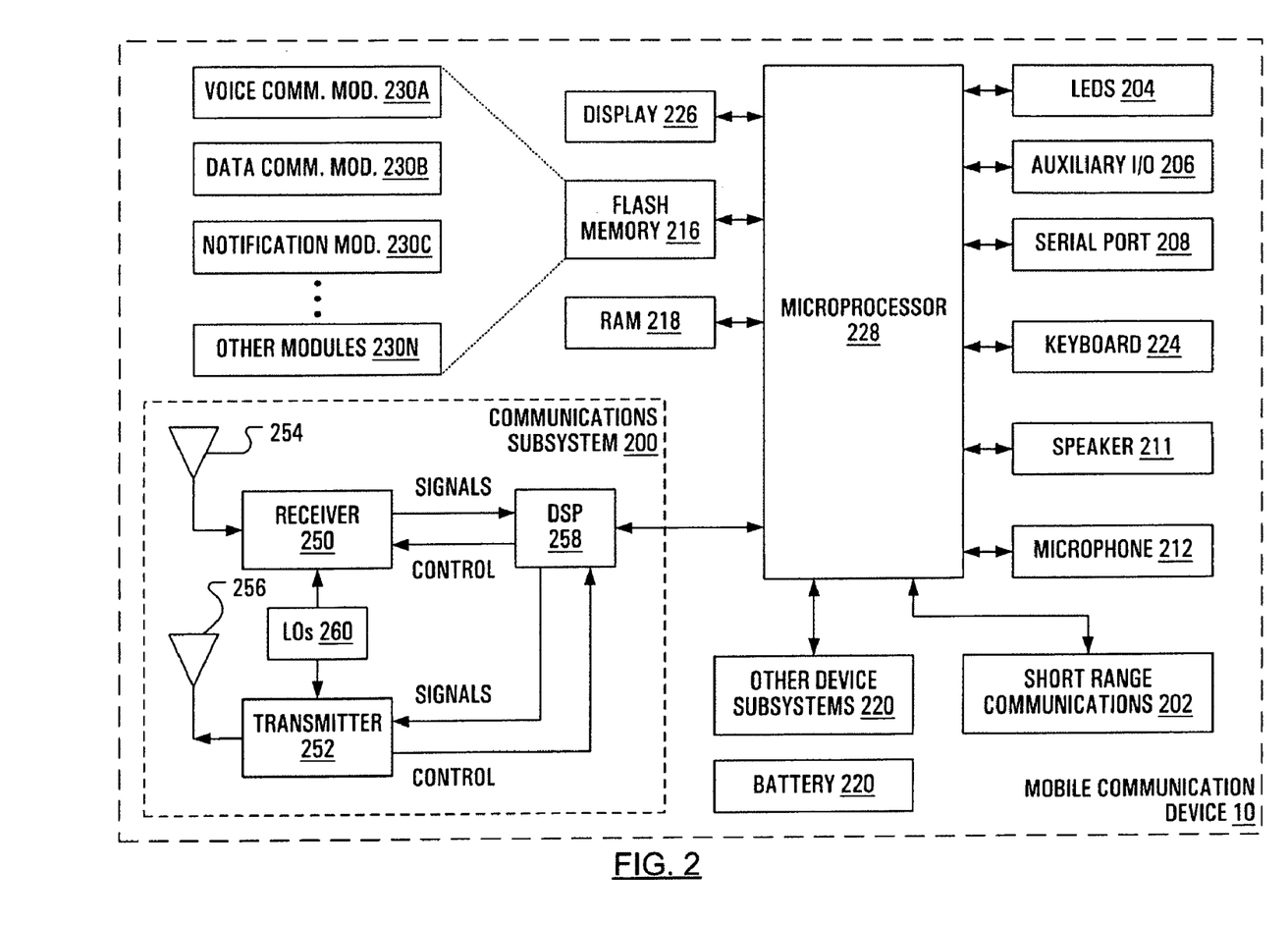
FIG. 2 is a schematic view of the hand-held electronic device of FIG. 1.

FIG. 1 illustrates a hand-held mobile communication device 10 including a vertically elongated housing 12, an input device, a keyboard 14, and an output device, a display 16, which is preferably a full graphic LCD. The keyboard 14 and display 16 are situated on the upper face 17 of the housing 12. Other types of output devices may alternatively be utilized. Internally, the hand-held may be organized as illustrated in FIG. 2. Turning to FIG. 2, a processing device, a microprocessor 18, is shown schematically as coupled between the keyboard 14 and the display 16. The microprocessor 18 controls the operation of the display 16, as well as the overall operation of the mobile device 10, in response to actuation of keys on the keyboard 14 by the user.

In addition to the microprocessor 18, other parts of the mobile device 10, shown schematically in FIG. 2, include: a communications subsystem 100; a short-range communications subsystem 102; the keyboard 14 and the display 16, along with other input/output devices including a set of auxiliary I/O devices 106, a serial port 108, a speaker 111 and a microphone 112; as well as memory devices including a flash memory 116 and a Random Access Memory (RAM) 118; and various other device subsystems 120. The mobile device 10 is preferably a two-way RF communication device having voice and data communication capabilities. In addition, the mobile device 10 preferably has the capability to communicate with other computer systems via the Internet.

Operating system software executed by the microprocessor 18 is preferably stored in a persistent store, such as the flash memory 116, but may be stored in other types of memory devices, such as a read only memory (ROM) or similar storage element. In addition, system software, specific device applications, or parts thereof, may be temporarily loaded into a volatile store, such as the RAM 118. Communication signals received by the mobile device may also be stored to the RAM 118.

The microprocessor 18, in addition to its operating system functions, enables execution of software applications 130A-130N on the device 10. A predetermined set of applications that control basic device operations, such as data and voice communications 130A and 130B, may be installed on the device 10 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 140. Preferably, the PIM data items are seamlessly integrated, synchronized and updated via the wireless network 140 with the device user's corresponding data items stored or associated with a host computer system.

Communication functions, including data and voice communications, are performed through the communication subsystem 100, and possibly through the short-range communications subsystem 102. The communication subsystem 100 includes a receiver 150, a transmitter 152, and one or more antennas 154 and 156. In addition, the communication subsystem 100 also includes a processing module, such as a digital signal processor (DSP) 158, and local oscillators (LOs) 160. The specific design and implementation of the communication subsystem 100 is dependent upon the communication network in which the mobile device 10 is intended to operate. For example, the communication subsystem 100 of the mobile device 10 may be designed to operate with the Mobitex™, DataTAC™ or General Packet Radio Service (GPRS) mobile data communication networks and may also be designed to operate with any of a variety of voice communication networks, such as AMPS, TDMA, CDMA, PCS, GSM, etc. Other types of data and voice networks, both separate and integrated, may also be utilized with the mobile device 10.

Network access requirements vary depending upon the type of communication system. For example, in the Mobitex™ and DataTAC™ networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the mobile device 10 may send and receive communication signals over the communication network 140. Signals received from the communication network 140 by the antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communication functions, such as demodulation and decoding. In a similar manner, signals to be transmitted to the network 140 are processed (e.g. modulated and encoded) by the DSP 158 and are then provided to the transmitter 152 for digital to analog conversion, frequency up conversion, filtering, amplification and transmission to the communication network 140 (or networks) via the antenna 156.

In addition to processing communication signals, the DSP 158 provides for control of the receiver 150 and the transmitter 152. For example, gains applied to communication signals in the receiver 150 and transmitter 152 may be adaptively controlled through automatic gain control algorithms implemented in the DSP 158.

In a data communication mode, a received signal, such as a text message or web page download, is processed by the communication subsystem 100 and is input to the microprocessor 18. The received signal is then further processed by the microprocessor 18 for an output to the display 16, or alternatively to some other auxiliary I/O devices 106. A device user may also compose data items, such as e-mail messages, using the keyboard 14 and/or some other auxiliary I/O device 106. The composed data items may then be transmitted over the communication network 140 via the communication subsystem 100.

In a voice communication mode, overall operation of the device is substantially similar to the data communication mode, except that received signals are output to a speaker 111, and signals for transmission are generated by a microphone 112. Alternative voice or audio I/O subsystems, such as a voice message recording subsystem, may also be implemented on the device 10. In addition, the display 16 may also be utilized in voice communication mode, for example to display the identity of a calling party, the duration of a voice call, or other voice call related information.

The short-range communications subsystem 102 enables communication between the mobile device 10 and other proximate systems or devices, which need not necessarily be similar devices. For example, the short-range communications subsystem may include an infrared device and associated circuits and components, or a Bluetooth™ communication module to provide for communication with similarly-enabled systems and devices.

Figure 3:
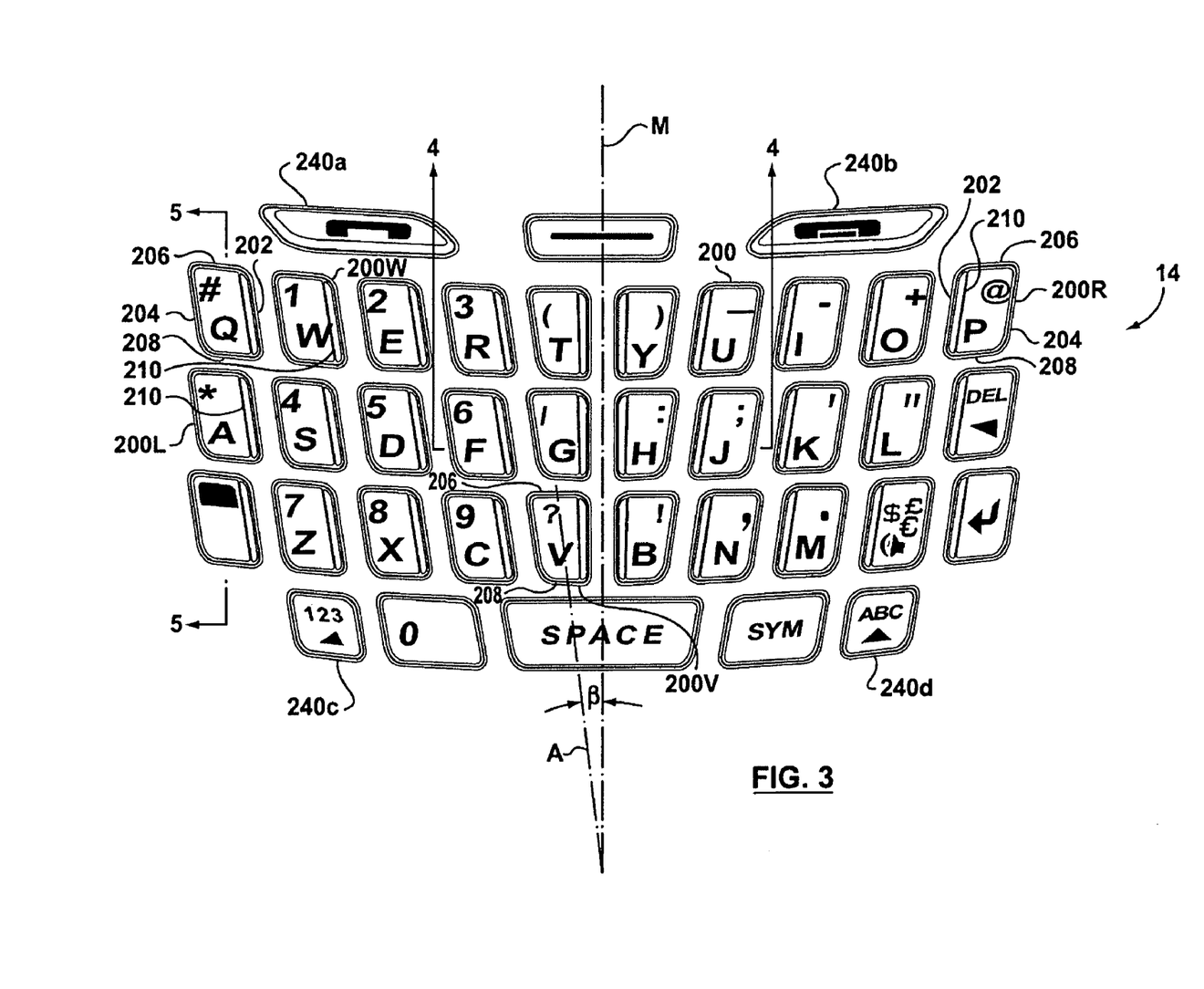
FIG. 3 is a front view of the keyboard of the device of FIG. 1.

Turning to FIG. 3, keyboard 14 has a plurality of indicia bearing keys 200 arranged in three rows. Some of the keys 200 bear letters, and these letter bearing keys form a QWERTY layout. Each key 200 is four-sided having an inner side 202, outer side 204, upper side 206, and lower side 208. The inner side 202 for the keys 200L, which keys are to the left of the longitudinal midline M of the keyboard, is at their right side, whereas the inner side 202 for the keys 200R, which keys are to the right of midline M, is at their left side. Each of the keys has a straight edge 210 proximate its inner side 202 which extends between upper side 206 and lower side 208 of the key. Each key presents a generally parallelogram-shaped outline. (However, the lower side 208 of each key in the two columns of keys closest to the longitudinal midline M of the keyboard 14, such as key 200V, is shorter than the upper side 206 of these keys.) The generally parallelogram-shaped outline of the keys provides each key, such as key 200V, with a major axis A aligned with its length dimension. The major axis of each key makes an angle, B, of between 20° and 70°, with the midline M of the keyboard, with this angle being a negative angle for keys 200L and a positive angle for keys 200R. One suitable choice for this angle is 40°.

Figure 4:
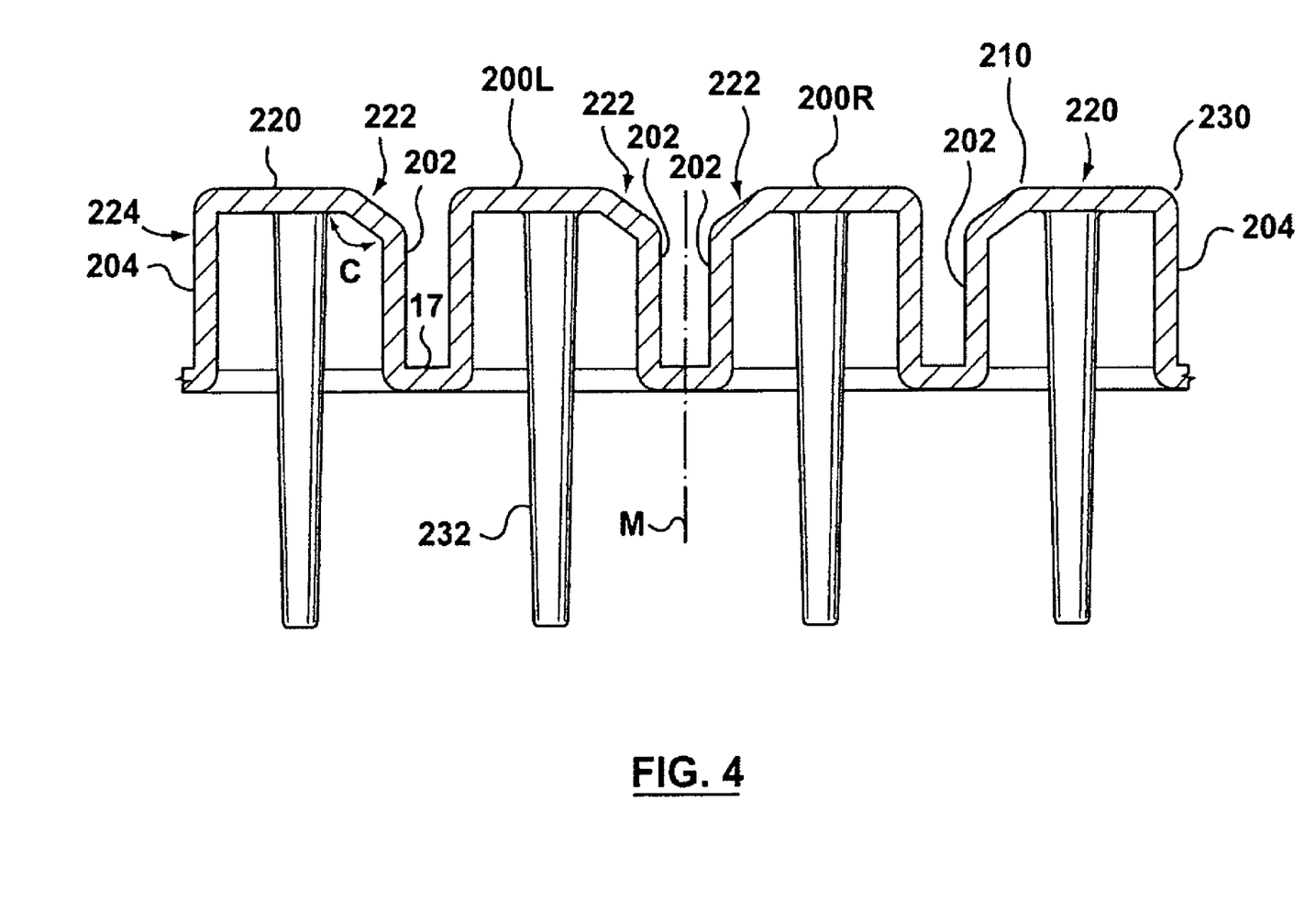
FIG. 4 is a cross-sectional view along the lines 4-4 of FIG. 3 (simplified in that the exterior of each key behind the cut line is not shown)
Figure 5:
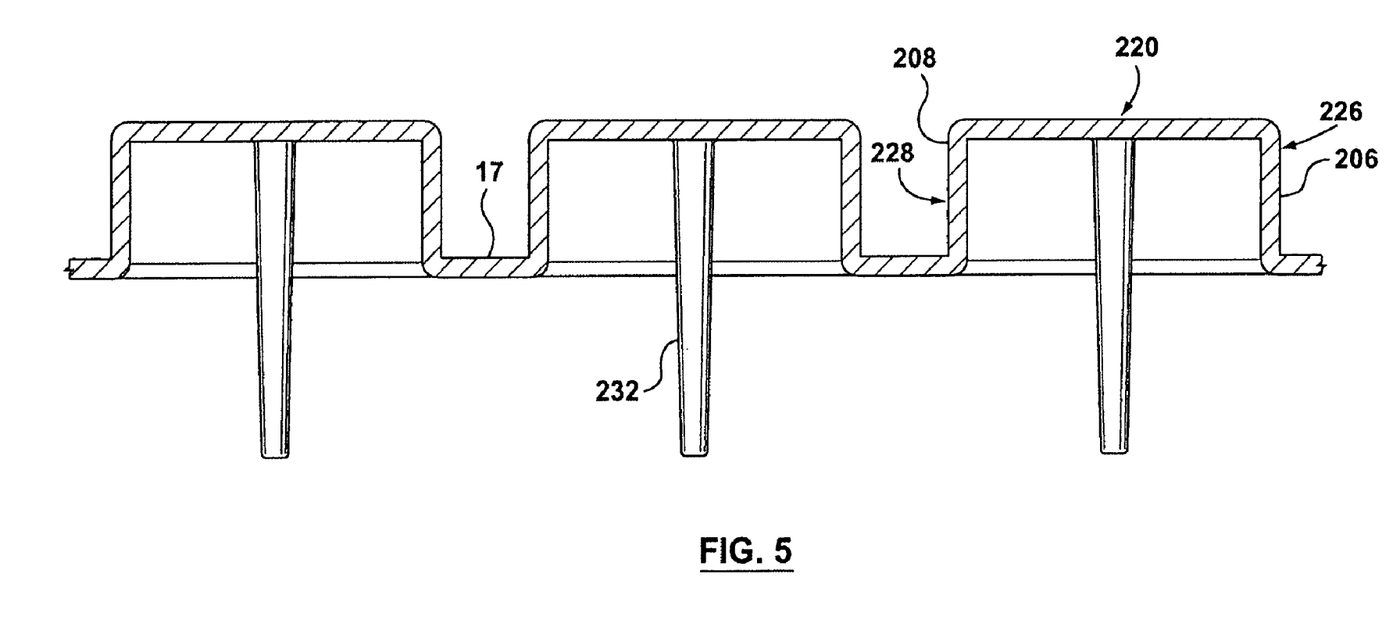
FIG. 5 is a cross-sectional view along the lines 5-5 of FIG. 3 (simplified in that the exterior of each key behind the cut line is not shown).

With reference to FIGS. 4 and 5, it will be apparent that each key 200 has a flat contact surface 220 which parallels the upper face 17 of the housing and extends to each of the four sides 202, 204, 206, 208 of the key. Further, it will be apparent that inner side 202 of each key 200 is beveled. This means that the inner side 202 of each key has a sloping planar surface 222 meeting the flat contact surface 220 along straight edge 210 at an obtuse angle C. Angle C may be between about 25° and 45°. Planar surface 222 extends the length of the key from upper side 206 to lower side 208.

As shown, straight edge 210 has a slight radius. The only requirement is that the edge 210 be sufficiently sharp so that it is felt by a user when pressing the key.

The outer side 204 of each key, which is opposite inner side 202, has a planar surface 224 meeting the flat contact surface 220 along a straight edge 230 at a right angle. Similarly upper side 206 has a planar surface 226 meeting the flat contact surface 220 at a right angle and lower side 208 has a planar surface 228 meeting the flat contact surface 220 at a right angle. While, in this example embodiment, these angles are shown as right angles, each could equally be substantially a right angle, which may be taken as any angle between about 80° and 100° such that when a key is pressed by the thumb of a user, the flesh of the thumb does not appreciably contact any of planar surfaces 224, 226, or 228.

It will be apparent from FIG. 3 that the inner sides 202 of the column of keys 200L, 200R on either side of the midline M of the keyboard face each other. In consequence, the sloping planar surface 222 of keys 200L on one side of the midline M is next to the sloping planar surface 222 of keys 200R on the other side of the midline M.

A pin 232 depends from each key 200 and sits atop a dip switch (not shown). Returning to FIG. 3, it will be apparent that for key 200W, the alphabetic letter "W" extends on the flat contact surface 220 past straight edge 210 onto the sloping planar surface 222. Further, in addition to keys 200, there are additional keys 240 on keyboard 14 such as on-hook key 240a, off-hook key 240b, shift key 240c and capital lock key 240d. Like keys 200, a pin extends from each of these additional keys 240 atop a dip switch.

The keys 200 and 240 of keyboard 14 may be made of a hard plastic material and the keys may be glued to a flexible film (such as an elastomeric or rubber film). In consequence, when pressure is applied to the contact surface 220 of any key 200, the flexible film is deformed to allow the key to be depressed so as to press its pin 232 against the underlying dip switch. The resulting electrical signal from the dip switch allows the microprocessor 18 (FIG. 2) to register the key press.

In operation, a user may grasp hand-held 10 such that upper surface 17 faces her, and her thumbs are over the keyboard 14. The user may then use her thumbs to depress selected keys 200 and 240 of the keyboard. In this regard, the angle β that the major axis of a key 200 makes with the longitudinal midline of the keyboard positions the key 200 so that it is more in line with the long dimension of the thumb as the thumb strikes the key. The beveled inner side 202 of a key 200 effectively provides a gap between the key and the one neighbouring key which faces the beveled inner side 202. This reduces the likelihood of inadvertently hitting two keys at the same time. Further, since only one side of the key is beveled, the size of contact surface 220 remains relatively large. As a thumb presses on a key 200, the user will feel the straight edge 210 and, likely, sloping planar surface 222 of the key. This tactile target will assure the user that her thumb is striking the intended key. Further, because the straight edge 210 and sloping planar surface 222 extend along the entire length of the key, the "bulls-eye" of the target extends along the length of the key. In consequence, there is a range of thumb positions on the key which will provide a user with feedback indicating the key has been properly struck. Of course the straight edge 210 and sloping planar surface 222, if not felt by a user who is trying to press a key, will indicate to the user that the intended key has not been properly struck.

With the sloping planar surface 222 of the keys 200L, 200R on either side of the midline M of the keyboard 14 being adjacent each other, a user has enhanced room to thumb keys on either side of the midline M of the keyboard.

Since the tactile feel of a key 200 indicates the key is properly struck for a range of thumb positions, the "bulls-eye" for a proper key strike is larger than with a key which provides the tactile feel that it has been properly struck only where the portion of the thumb striking the key is precisely positioned on the key. Such is a perceived problem with a domed key, where the tactile feel indicates a key is properly struck only if hit squarely so that the peak of the dome is at the middle of the striking portion of the thumb. A larger target bulls-eye means a higher percentage of key strikes providing feedback indicating a proper key strike. This higher percentage results in a higher confidence level for the user which translates to a faster typing speed. It should also be apparent that keys providing a tactile target to a user better builds confidence, and therefore results in a faster typing speed, than do keys providing effectively no tactile target, such as keys simply having a flat contact surface and no other tactile features.

The sloped planar face 222 of each key 200, while not on the flat contact surface 220 of the key nevertheless faces the user. In consequence, if during the printing of letters on the keys 200, a letter is partially printed on this sloping face 222 (as is the case with key 200W shown in FIG. 3), the letter will remain legible to the user. This is advantageous given the small size of the keys 200 and the inherent manufacturing tolerances in printing letters on the keyboard 14.

Although contact surface 220 of keys 200 has been described as flat in the example embodiment, this surface could instead be substantially flat, such that, for example, a suitable contact surface would be a surface which is slightly convex or concave. Similarly, although sloped surface 222 has been described as planar, this surface could instead be substantially planar, such that, for example, a suitable substantially planar surface would be a surface which is slightly scalloped along its length. Similarly, while sides 204, 206, 208, and side 202 below sloped surface 222 have been described as planar, these sides could, equally, be substantially planar and thus, for example, the sides could be slightly bowed. Furthermore, these sides could also notch in, such that each key 200 had an enlarged head and narrower neck.

Although the keys 200 have been shown as having a generally parallelogram-shaped outline, equally other key outlines would be possible. For example, the keys could have an oval outline with a major axis aligned with axis A. This is not preferred, however, since the planar surface 222 of the keys would be narrower proximate the upper and lower edges of the keys and, consequently, the keys would have a smaller effective target area. The keys could also have a rectangular outline with the keys having their length either aligned with axis A or with the midline M of the keyboard. Again, however, these options are not preferred as they have ergonomic drawbacks.

While keyboard 14 is shown as having a QWERTY layout, any other know layout, such as an AZERTY, QUERTZ, or Dvorak layout, is possible.

It will be apparent that keyboard 14 may be utilized with a hand-held device which provides different functionality than hand-held 10, such as a hand-held which merely acts as an address book.

Other modifications will be apparent to those skilled in the art and, therefore, the invention is defined in the claims.

What is claimed is:

1. A hand-held electronic device comprising:
a keyboard, said keyboard having a plurality of keys of identical shape, each key having a substantially flat contact surface extending between a first side and an opposed second side of said each key, said first side having a substantially planar upper portion meeting said contact surface at an obtuse angle; said second side having a substantially planar surface meeting said contact surface at substantially a right angle; said keys oriented such that, for each of a plurality of pairs of adjacent keys, said second side of one key of each pair faces said first side of an adjacent key of each pair.

2. The device of claim 1 wherein said obtuse angle is between 135° and 155°.

3. The device of claim 2 wherein said planar upper portion of said first side meets said contact surface along a straight edge.

4. The device of claim 2 wherein said each key has a third side extending from said first side to said second side and an opposed fourth side extending from said first side to said second side, each of said third side and said fourth side having a substantially planar surface meeting said contact surface at substantially a right angle.

5. The device of claim 1 wherein said plurality of keys comprise first keys located left of a midline of said keyboard and second keys located right of said in midline of said keyboard and wherein said first side of each first key is at a right hand side of said first key and wherein said first side of each second key is at a left hand side of said second key.

6. The device of claim 5 wherein said each key has a major axis which makes an angle of between 20 and 70 degrees with said midline.

7. The device of claim 5 wherein said each key has a major axis which makes an angle of about 40 degrees with said midline.

8. The device of claim 6 wherein said major axis of each of said first keys makes a negative angle with said midline and said major axis of each of said second keys makes a positive angle with said midline.

9. The device of claim 8 wherein a length dimension of each of said keys is aligned with said major axis of each of said keys.

10. The device of claim 1 wherein said contact surface of each of said keys has a generally parallelogram shaped outline.

11. The device of claim 5 wherein said keys bear alphabetic letters.

12. The device of claim 11 wherein said alphabetic letters extend on said contact surface and at least some of said alphabetic letters extend front said contact surface onto said substantially planar upper portion of said first side.

13. The device of claim 12 wherein said keys are arranged in three rows and bear alphabetic letters according to the layout of a QWERTY keyboard.

14. The device of claim 2 further comprising:
a display; and
a processor operatively connected to said keyboard and said display.

15. A hand-held electronic device, comprising:
a keyboard on an upper face of said hand-held electronic device;
said keyboard having a plurality of keys of identical shape;
each key of said keys having an upper surface extending between a first side and an opposed second side, said upper surface comprising a first substantially planar upper surface portion extending from said first side and a second substantially planar upper surface portion extending from said second side, said first planar upper surface portion meeting said second planar upper surface portion at an angle;
said second planar upper portion substantially paralleling said face;
said first planar upper surface portion angled with respect to said second upper surface planar portion such that said first planar upper surface portion slopes from said second planar upper surface portion toward said upper face;
said second side extending at substantially a right angle to said second substantially planar upper surface portion;
said keys oriented such that, for each of a plurality of pairs of adjacent keys, said second side of one key of each pair faces said first side of an adjacent key of each pair.

16. The device of claim 15 wherein said second planar upper surface portion meets said first planar upper surface portion at a straight edge.

17. The device of claim 16 wherein said second planar upper surface portion meets said first planar upper surface portion at an angle of between 135° and 155°.

18. The device of claim 17 wherein said first side is substantially planar face and extends at substantially a right angle to said second planar upper surface portion.

19. The device of claim 18 wherein said first side meets said first planar upper surface portion at a straight edge and wherein said second side meets said second planar upper surface portion at a straight edge.

20. The device of claim 18 wherein said each key has opposed substantially planar end surfaces meeting said second planar upper surface portion at substantially a right angle.

21. The device of claim 15 wherein said keys comprise first keys located left of a midline of said keyboard and second keys located right of said midline of said keyboard and wherein said first substantially planar upper surface portion of each first key is at a right hand side of said first key and wherein said first substantially planar upper surface portion of each second key is at a left hand side of said second key.

22. The device of claim 18 wherein said second upper planar portion of said each key has a generally parallelogram shaped outline.

* * * * *

UNITED STATES PATENT AND TRADEMARK OFFICE
CERTIFICATE OF CORRECTION

PATENT NO. : 7,417,565 B2  Page 1 of 1
APPLICATION NO. : 11/245809
DATED : August 26, 2008
INVENTOR(S) : Jason T. Griffin It is certified that error appears in the above-identified patent and that said Letters Patent is hereby corrected as shown below:

Column 6,
Line 58, "The device of claim 2" should be changed to --The device of claim 3--.

Column 6,
Line 66, delete the word "in" before "middle of said".

Column 7,
Line 23, "alphabetic letters extend front" should be changed to --alphabetic letters extend from--.

Column 8,
Line 22, delete the word "face" before "and extends at substantially a right angle".

Signed and Sealed this

Second Day of June, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,417,565 B2  
APPLICATION NO. : 11/245809  
DATED : August 26, 2008  
INVENTOR(S) : Jason T. Griffin Page 1 of 1

It is certified that error appears in the above-identified patent and that said Letters Patent is hereby corrected as shown below:

Column 4,
Line 42 to 43, "may be between about 25° and 45°." should be changed to --may be between about 135° and 155°.--.

Signed and Sealed this

Fifth Day of January, 2010

David J. Kappos
*Director of the United States Patent and Trademark Office*